April 19, 1955    D. W. WANER    2,706,417
CONSTRUCTION OF FLEXIBLE CONTROL CABLES
Filed March 15, 1951    3 Sheets-Sheet 3

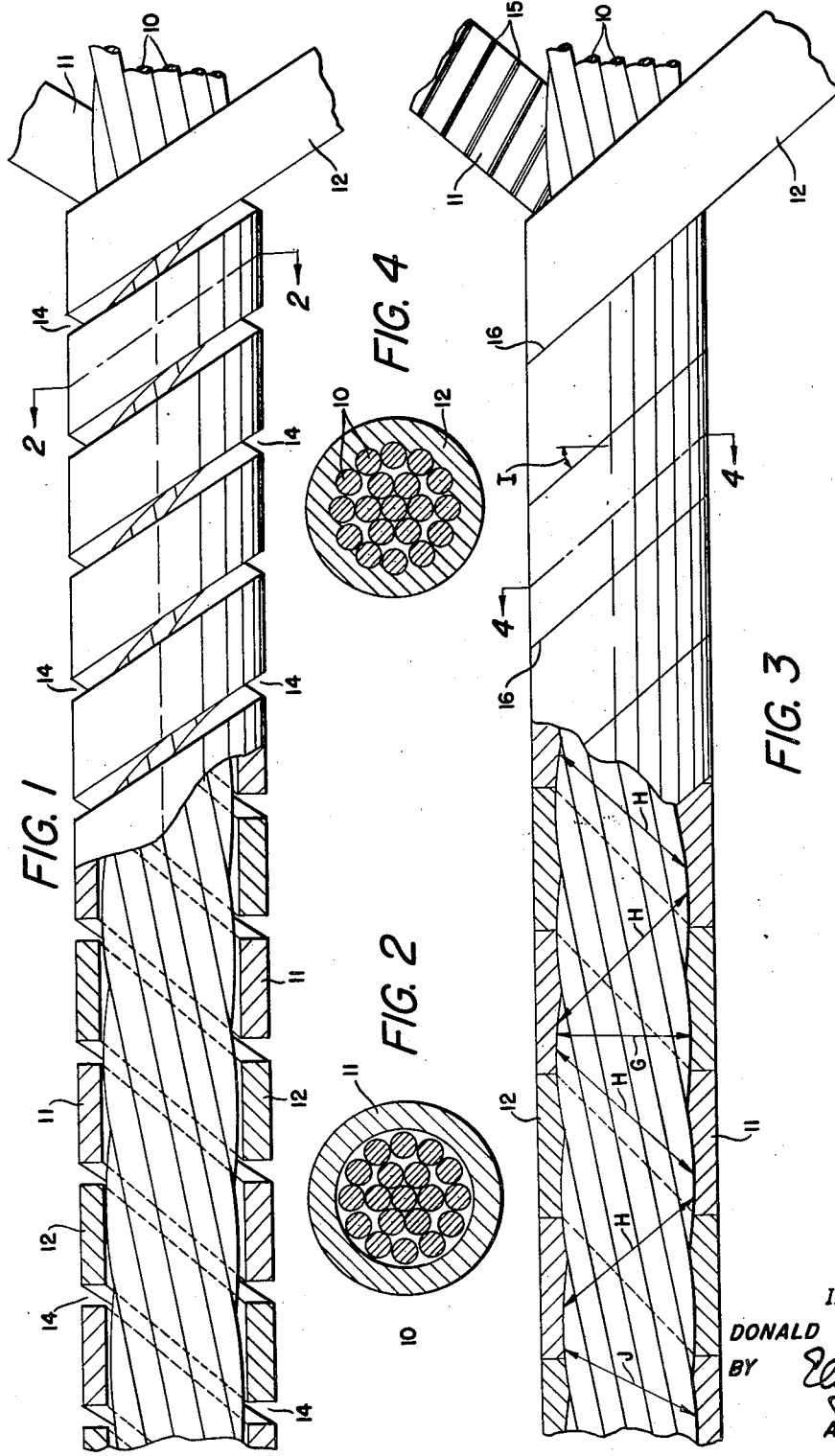

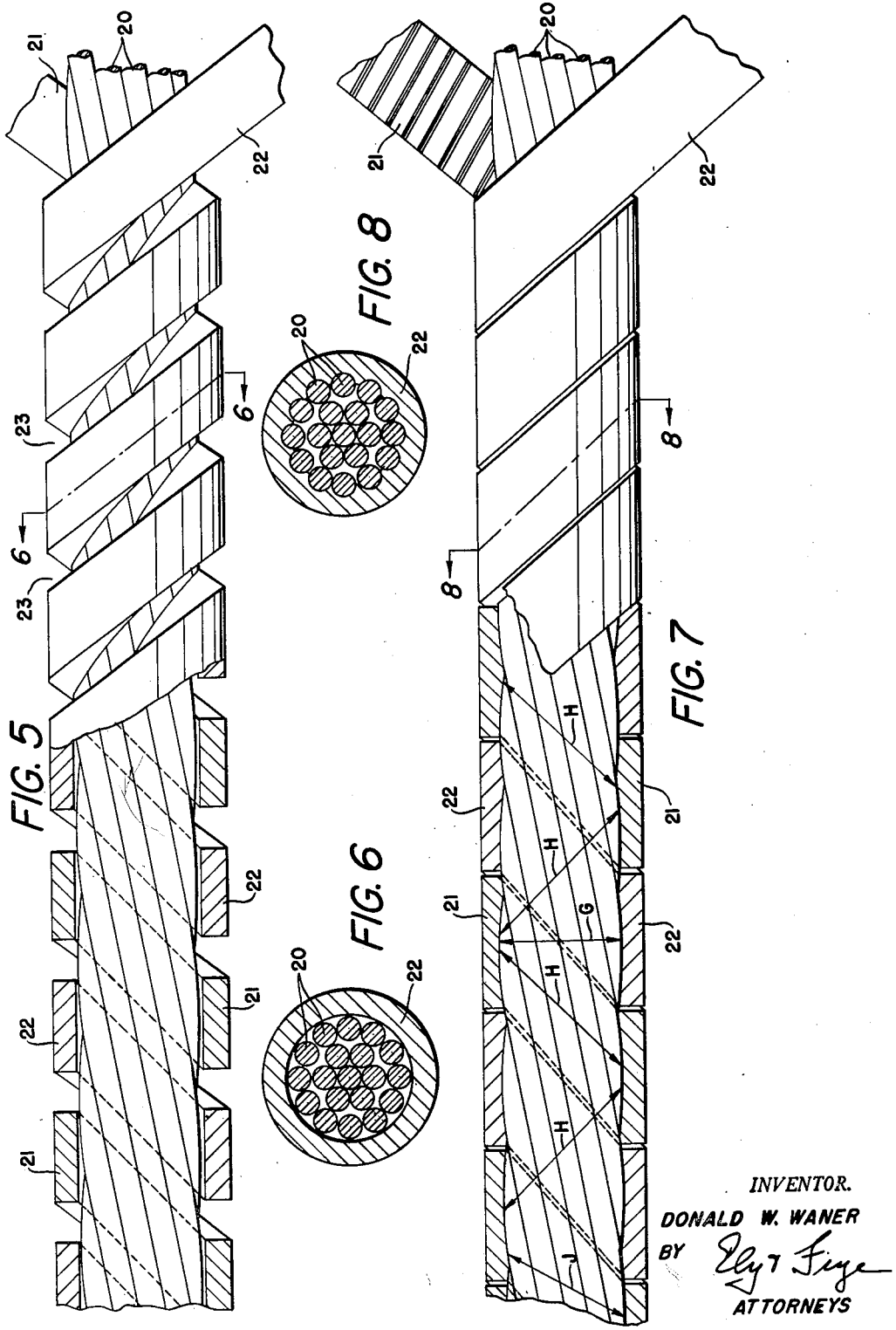

INVENTOR.
DONALD W. WANER
BY
ATTORNEYS

United States Patent Office 2,706,417
Patented Apr. 19, 1955

2,706,417

CONSTRUCTION OF FLEXIBLE CONTROL CABLES

Donald W. Waner, Cuyahoga Falls, Ohio, assignor to The Morse Instrument Company, Hudson, Ohio, a corporation of Ohio Application March 15, 1951, Serial No. 215,739

10 Claims. (Cl. 74—501)

It is the purpose of the present invention to improve upon the construction and method of making flexible control cables, which are commonly referred to as "push pull" cables because of their use in the transmission of motion from a remote control station. Such "push pull" cables are usually housed in an outer casing in which the cable slides with certain clearance for ease in operation and it is necessary, therefore, to provide a smooth outer surface on the cable and a smooth inner surface on the casing so that the cable will operate with the minimum of friction between the cable and the casing. The best known type of casing is one in which the inner surface of the casing is made of a spirally wound, flat wire covered with a water-proof and wear-resisting outer jacket. The cable is designed to transmit power around bends and over obstructions and, for this purpose, it must have a certain degree of flexibility and it must also have sufficient springiness so that it will return to its normally straight line condition; otherwise it will assume permanent bends which will create contact points with the casing and interfere with the smooth operation of the cable.

The cable must also have a high degree of longitudinal rigidity especially if it is used for the transmission of heavy compression loads for otherwise the cable will bend or jam in the casing.

All of these requirements and others are well known to those familiar with the art, but even the best known type of push pull cable heretofore made has many objections and has failed to give complete satisfaction.

It is the purpose of the present invention to provide a new type of "push pull' cable which is far superior to those currently used in respect to its ability to transmit heavy compression loads. It has a smoother outer surface and hence slides more smoothly along the interior of the casing. It has a higher degree of springiness than the best known cables of the prior art and hence snaps back more readily to straight line condition after having been required to pass around bends or corners. It is also easier and cheaper to manufacture because of the fact that certain operations used in the manufacture of prior cables are not necessary with the new form of cable and the cable is better without those operations.

The best type of cable heretofore known and used is the so-called "high efficiency" cables, which consist of an inner core made of nineteen wire strands wrapped in the usual spiral cable construction. Over this inner core there is applied a spiral wrapping of a single flat steel wire or ribbon which is usually applied at a helical angle of approximately 17°. The outer wrapping is applied in an opposite direction or hand with respect to the inner wrapping of the casing. After the outer wrapping is applied, the cable is put through a swaging process, which compresses the outer wrapping about the inner core and forces the metal of the outer wrapping into the crevices between the several wires constituting the outer layer of the cable. This operation is necessary in order to interlock the outer casing with the inner core so that relative axial movement between the casing and the core will be prevented.

So far as the prior art procedure has been described above, the process is that which is described in the Kuney Patent No. 1,970,702, August 21, 1934. A wire cable made in accordance with the teachings of said Kuney patent is wholly valueless because such a cable is so rigid that it cannot be used as a flexible cable. This is due to the fact that the constrictive action of the spiral wrapping, when swaged down tightly onto the inner cable, as is necessary to provide the interlock between casing and core, effectively inhibits any free action of the inner core so that it cannot flex the required amount in service.

It has been found necessary, therefore, to put the cable made by the teachings of the Kuney patent through a further series of operations to impart sufficient flexibility to the cable so that it may function in the desired manner.

One method of imparting flexibility to a cable of this type is to crush and reform it repeatedly by applying compression to the cable at points spaced about the cable which tends to stretch the outer spiral wrapping a minute amount and loosens up the strands of the inner core to provide a sufficient freedom of movement between the outer casing and the core so that the cable is sufficiently flexible to pass around bends and has sufficient springiness to return to its straightened condition.

These repeated compressions and releases of the cable, while giving to the cable the essential flexibility and springiness, create objectionable features which impair its utility. In the manufacture of commercial cables of this type, apparently a compromise is reached between the ideals expressed in the Kuney patent and the practical requirements for a "push-pull" cable.

The subsequent steps or loosening up operations invariably upset the alignment of the successive turns of the outer wrapping and also cause irregularities in the spacing of the successive turns of the outer wire covering. These irregularities are visible to the eye and can be felt by running a finger over the surface of the wire. This destroys the smooth surface to such an extent that a finished cable of this type will not have the maximum smoothness of operation.

While a cable made in the manner recited will have sufficient springiness to make it usable under some conditions, it is somewhat limp and is therefore incapable of transmitting very heavy compression loads without excessive bending, which creates additional points of contact with the casing, accentuated by the roughness of the cable. The cable, consequently, tends to catch on the inner surface of the casing, especially at the crevices between the flat wire forming the inner surface of the casing.

There are shown and described herein two forms of the present invention, each of which obviates the objections to the commercial forms of high efficiency cables. Both forms have common attributes but one form is particularly adapted for transmitting very heavy compression loads, such loads as are impossible to efficiently transmit with the standard form of cable. The other form is adapted to the transmission of lighter loads. Both forms are equally capable of transmitting tension loads.

While the invention is shown and described with a great deal of particularity and detail, it will be understood that details may be modified so long as the basic principles of the invention are retained as set forth in the claims appended hereto.

The two forms of cables are shown in the more common one-eighth-inch cross section, but the size of the cable and the details of the core member and outer wire wrapping may be varied for any condition or requirement of use. In the drawings filed herewith the cables are shown as highly magnified in order to enable the invention to be more readily understood.

In the drawings:

Fig. 1 is a longitudinal view showing a cable of the improved type in the first stages of its manufacture, a part of the outer covering being in section. This cable is of the high compression load type previously referred to above.

Fig. 2 is a cross section thereof on the line 2—2 of Fig. 1.

Fig. 3 is a view similar to Fig. 1, but showing the completed cable.

Fig. 4 is a section on the line 4—4 of Fig. 3.

Fig. 5 is a view similar to Fig. 1 but showing the more flexible type.

Fig. 6 is a section on the line 6—6 of Fig. 5.

Fig. 7 is a view similar to Fig. 3 but showing the second type of cable.

Fig. 8 is a section on the line 8—8 of Fig. 7.

Referring to the standard form of "push pull" cable now in general use, the outer wrapping of flat steel wire or ribbon is a single spiral wrapped at about a 17° helical angle. This means that at each wrap or turn of the outer steel wire or ribbon the wire at one side of the cable overlaps a substantial extent of the same turn of the wire on the opposite side of the cable.

Figure 9:
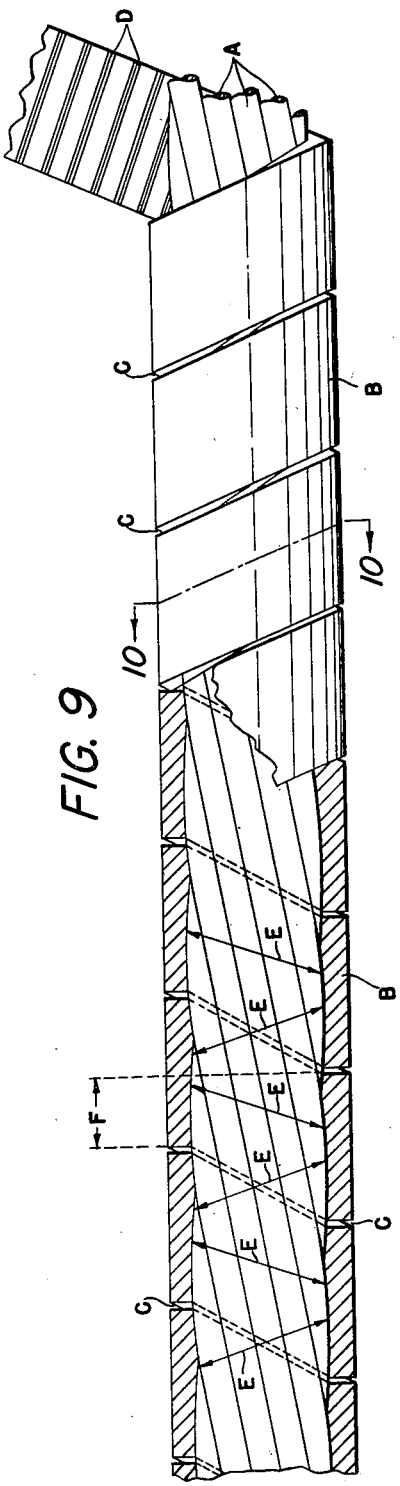
Fig. 9 is a view similar to Fig. 1, showing the old type of "high efficiency" cable and is necessary for a complete understanding of the improvement which has been made by this invention.
Figure 10:
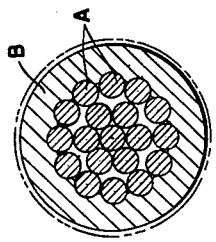
Fig. 10 is a section on the line 10—10 of Fig. 9.

In Figs. 9 and 10, which illustrate the old type cable, the inner core member composed of the nineteen strands cabled together is indicated at A and the outer spiral wrapping is indicated at B. This has been applied spirally about the core with sufficient lead so as to provide a space between adjacent edges of the spiral wraps so that adjacent spiral turns will have the ability to shift relatively to one another after the swaging operation, and the cable will have the property of flexibility when it is completed. Such spacing in the finished cable is shown at C. When the outer covering has been swaged down upon the core, the strands A will be crowded together and deformed somewhat and the metal of the outer covering ribbon will flow into the crevices between the outer strands of the core, the ridges on the interior of the outer wrapping which are caused by the swaging action being given the designation D. Fig. 9 shows the ribbon stripped from the core to expose these ridges.

It will be seen that in every cross section of the cable the inner core is completely enclosed by a single turn or wrap of the outer covering wire. This is indicated at numerous points where the arrows E are applied extending from the inside of an individual turn of the ribbon on one side of the core to the inside of the turn of ribbon on the opposite side of the core. The extent of overlap at any one point is indicated by the lines F.

It will be seen that when the swaging operation is performed, the core is rigidly held at every point along its length within a solid ring of steel ribbon. This condition makes it absolutely essential that the wire be worked and kneaded by numerous compressions or squeezes applied from every direction in order to loosen up the whole structure and to provide some space between the outer surface of the core and the outer wrapping; otherwise the cable is so rigid that it will not have sufficient springiness and flexibility to perform its functions properly. In short, without the subsequent working or kneading of the wire it will be absolutely useless for the purposes intended.

Referring now to Figs. 1 to 4, inclusive:

The inner core member of nineteen strands cabled together is indicated at 10. The outer cover is composed of two flat steel wires or ribbons which bear the numerals 11 and 12. These ribbons are spirally wrapped about the core as shown in Fig. 1 with sufficient space 14 between the successive turns to permit the subsequent swaging operation. It will be seen that the wrapping is applied at a much steeper helical angle I than in the old practice. In the cable herein illustrated, this angle is approximately 37°. The cable is now subjected to the swaging operations, which forces the outer wrapping down onto the core and into the crevices around the outer surface of the core forming the ridges 15 on the inner surface of the outer wrapping. In this view, the original spacing 14 has been selected and determined so that the adjacent edges of the spiral wraps abut at the completion of the swaging operation as indicated by the reference numeral 16. It will be noted that at every point along the cable each helical wrap of the covering ribbon or flat wire 11 or 12 is opposed by the other wrap 12 or 11. This is indicated by the arrows G and H, the former extending across the wire from ribbon 11 to ribbon 12, and the latter between turns of the same ribbon.

It will thus be seen that at no point along the cable is the core held between turns of the same wire so that the constrictive force indicated by the lines E—E in Fig. 9 is never present.

The result of the above described improvement over the old type of cable is that the kneading or working operation is not necessary. Without this operation the cable is flexible, yielding and springy, and this is true even though the edges of the wire ribbon are in contact. Even a relatively direct line of force indicated by the arrow J in Fig. 3 is ineffective to cause any measurable amount of restriction.

The cable shown in Figs. 1 to 4, inclusive, has a remarkable resistance to compression loads. Loads which would cause the old type cable to bend and kink are transmitted by this cable without kinking or buckling. Hence it is far superior to the old type of cable for such purposes.

Due to the fact that the spiral turns are in contact, the bending of the wire as it follows the bends of the casing will cause a certain degree of rotation or torsional movement of the cable on itself. This, however, is not objectionable because the rotation of the cable, or its torsional movement is all confined to the area of the cable near the bend and does not transmit itself in any way to the end fittings of a complete cable assembly. The ability of the cable to rotate upon itself during bending is due to the steep helical angle at which the outer wrapping is applied. A helical angle within the range stated permits the spiral turns to slide over each other, a property not present where the helical angle is in the nature of 17° as in the past.

It will also be noted that the absence of the kneading operation, necessary with the old type of cable, makes it possible to obtain an absolutely smooth surface on the outside of the cable. Whereas, in the old process, numerous irregularities were created by the kneading process, such irregularities are not present and the cable retains all of the smoothness and finish which is imparted to it by the swaging operation.

Referring to Figs. 5 to 8, inclusive, the procedure is exactly the same.

In these views the inner core is indicated at 20 and the two flat wire ribbons are indicated at 21 and 22. In this case the initial turns of the flat covering ribbons are spaced apart to a somewhat greater extent, as indicated by the numeral 23, so that at the end of the swaging operation there is provided a slight spacing between the several spiral turns of the outer wrapping. This gives a more flexible cable than in the case of Figs. 1 to 4, inclusive, but the smooth surface of the cable is not destroyed because after the swaging operation no ribbon at any point projects above the smooth circumference of the cable.

Where the helical angle at which the wraps are applied is in the neighborhood of 37°, this angle will be changed as effected by the diameter of the cable and the width of the ribbons constituting the outer wrapping. The essential feature of the invention is the use of a plurality, but preferably two, outer ribbons in adjacent parallel spirals so that at every point along the cable the core is held between spiral turns of the two ribbons rather than by a single spiral turn of a single ribbon. Stated in another way, the spiral turns of any one ribbon at no point overlaps upon itself. The width of the ribbons should be such that in covering the core a helical angle of such a value will be generated as to permit the cable to rotate upon itself and the turns of the covering to slide upon themselves when the cable is bent. This obviates the necessity of spacing between turns.

It will be seen that a vastly superior cable of the push pull variety has been developed. One of the minor considerations is the economy in production, but the major considerations are that a cable with an absolutely smooth surface is produced and that the cable is capable of transmitting, without buckling, compression loads far in excess of any loads successfully transmitted by the old type cable.

What is claimed is:

1. A flexible cable of the type set forth having an inner core member composed of strands cabled together, and an outer covering comprising two flat ribbons spirally wound about the core, the winding being such that in every transverse cross section of the cable one of said ribbons is diametrically opposed by the other ribbon, said ribbons occupying the crevices of the core so as to interlock therewith.

2. A flexible cable of the type set forth having an inner core member composed of wire strands cabled together, and an outer covering comprising two flat ribbons spirally wound about the core, the winding being such that at no point along the cable does one spiral turn of a ribbon overlay itself, the metal of the ribbons being displaced so as to occupy crevices between the outer wire strands of the core.

3. A flexible cable of the type set forth having an inner core member comprising wire strands cabled together, and an outer covering comprising two metal ribbons spirally wound in a single layer in parallel about the core, the winding being such that at every transverse plane along the cable one ribbon is diametrically opposed by the other ribbon, the edges of each ribbon being in contact with the opposed edges of the other ribbon, the ribbons being interlocked with the core by metal displaced from the inner surfaces of the ribbons.

4. A flexible cable having an inner flexible core member and an outer covering comprising two metal ribbons spirally wound in parallel about the core in a single layer, the winding being such that at every transverse plane along the cable one ribbon is diametrically opposed by the other ribbon, the edges of one ribbon being in contact with the opposed edges of the other ribbon, the outer covering being interlocked with the core.

5. A flexible cable having an inner flexible core member and an outer covering comprising two metal ribbons spirally wound in parallel about the core in a single layer and interlocked with the core, the winding being such that at every transverse plane along the cable one ribbon is diametrically opposed by the other ribbon, the edges of one ribbon being in contact with the edges of the other ribbon and the helical angle of said spiral winding being sufficient to allow adjacent edges of the ribbons to slide spirally relatively to one another when the cable is bent.

6. A flexible cable having an inner flexible core member and an outer covering comprising two metal ribbons spirally wound in parallel about the core in a single layer and interlocked with the core, the winding being such that at every transverse plane along the cable one ribbon is diametrically opposed by the other ribbon, the edges of one ribbon being in contact with the edges of the other ribbon and the helical angle of said spiral winding being sufficient to allow the cable to rotate torsionally upon itself when the cable is bent.

7. A flexible cable in accordance with claim 5 in which the helical angle is of a value approximately 37°.

8. A flexible cable in accordance with claim 6 in which the helical angle is of a value approximately 37°.

9. A flexible cable of the type set forth having an inner core member comprising wire strands cabled together, and an outer covering comprising two metal ribbons spirally wound in a single layer in parallel about the core, the winding being such that at every transverse plane along the cable one ribbon is diametrically opposed by the other ribbon, the edges of each ribbon being spaced from the opposed edges of the other ribbon and the helical angle of said spiral winding being sufficient to allow adjacent edges of the ribbons to slide spirally relative to each other when the cable is bent, the ribbons being interlocked with the core by metal displaced from the inner surfaces of the ribbons.

10. A flexible cable having an inner flexible core member and an outer covering comprising two metal ribbons spirally wound in parallel about the core in a single layer, the winding being such that at every transverse plane along the cable one ribbon is diametrically opposed by the other ribbon and the helical angle of said spiral winding being sufficient to allow the cable to rotate torsionally upon itself when the cable is bent, the edges of one ribbon being spaced from the opposed edges of the other ribbon, the outer covering being interlocked with the core.

References Cited in the file of this patent

UNITED STATES PATENTS

| | | |
|---|---|---|
| 1,970,702 | Kuney | Aug. 21, 1934 |
| 2,002,479 | Angell et al. | May 21, 1935 |
| 2,003,673 | Zapf | June 4, 1935 |
| 2,072,284 | Voorhees | Mar. 2, 1937 |
| 2,081,691 | Zapf | May 25, 1937 |
| 2,135,800 | Davignon | Nov. 8, 1938 |
| 2,438,380 | Arens | Mar. 23, 1948 |

FOREIGN PATENTS

| | | |
|---|---|---|
| 779,083 | France | Jan. 5, 1935 |